United States Patent
Heaton et al.

[15] 3,690,783
[45] Sept. 12, 1972

[54] ADJUSTING COLLAR ARRANGEMENT, ESPECIALLY FOR A BORING BAR

[72] Inventors: James W. Heaton, Greensburg; William C. Eversole; Ernest J. Friedline, both of Latrobe, all of Pa.

[73] Assignee: Kennametal Inc., Latrobe, Pa.

[22] Filed: June 22, 1970

[21] Appl. No.: 47,947

[52] U.S. Cl. .................... 408/146, 408/186, 82/36
[51] Int. Cl. ........................................ B23b 29/02
[58] Field of Search......408/186, 197, 199, 238, 146, 408/147, 153; 82/36, 24; 29/96

[56] References Cited

UNITED STATES PATENTS

| | | |
|---|---|---|
| 3,125,903 | 3/1964 | Briney, Jr. et al. ........408/151 |
| 3,404,590 | 10/1968 | Sweeny..................408/197 X |
| 3,447,403 | 6/1969 | Vogel, Sr. et al. .........408/146 |

*Primary Examiner*—Gil Weidenfeld
*Attorney*—Melvin A. Crosby

[57] ABSTRACT

An adjusting collar arrangement for mounting on a boring bar or the like to effect fine adjustment of the boring bar. The collar has a part which is fixedly clamped to the boring bar and another part threaded thereon with a fine thread which abuts the support for the boring bar so that by loosening the boring bar in its support, the threaded part of the adjusting collar can be rotated and thereby effect fine axial adjustment of the boring bar.

4 Claims, 12 Drawing Figures

Patented Sept. 12, 1972
3,690,783
2 Sheets-Sheet 1
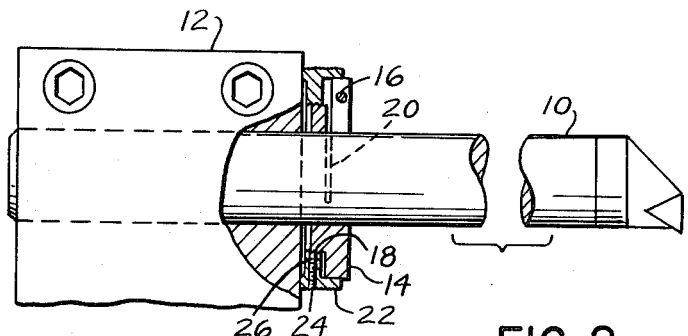
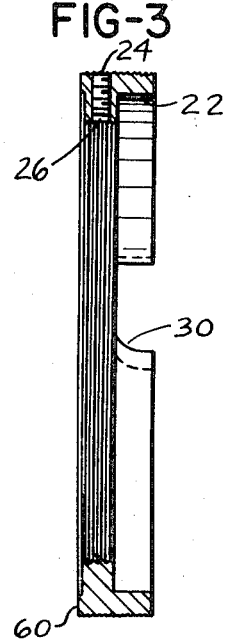
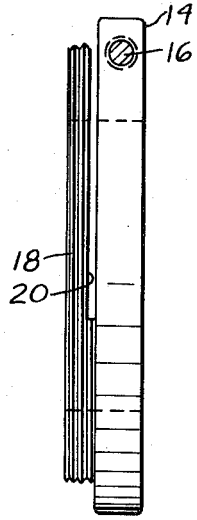
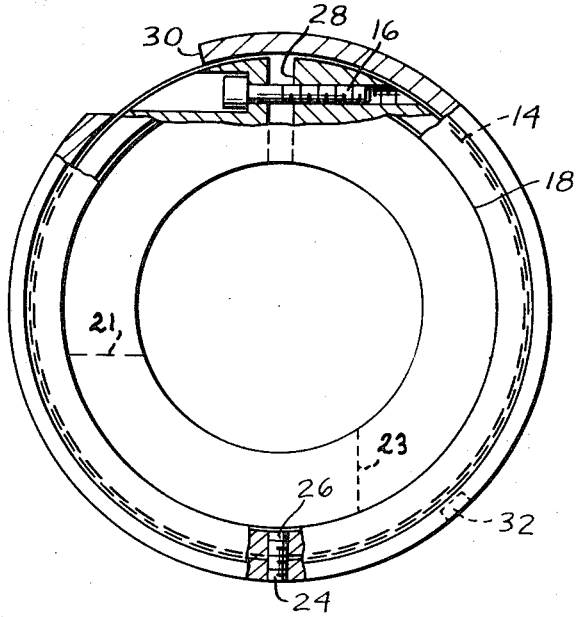
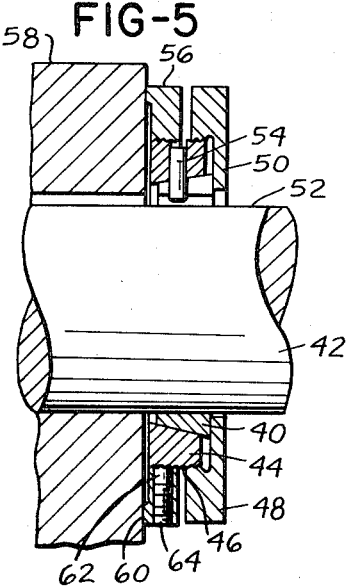
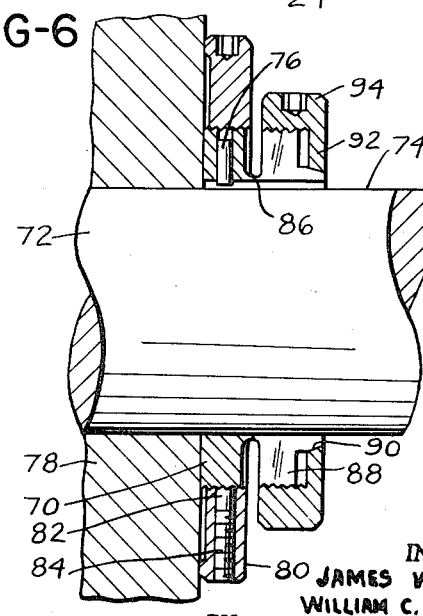
INVENTORS
JAMES W. HEATON
WILLIAM C. EVERSOLE
ERNEST J. FRIEDLINE
BY Patented Sept. 12, 1972
3,690,783
2 Sheets-Sheet 2
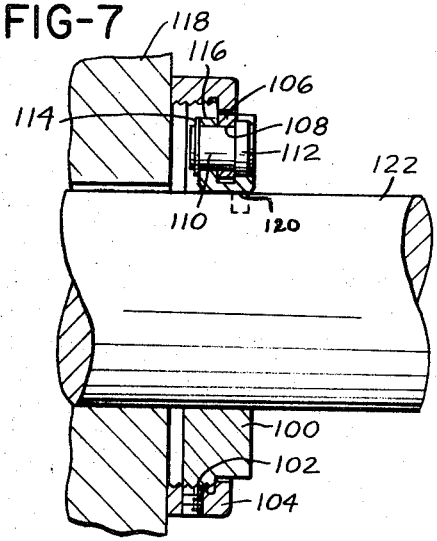
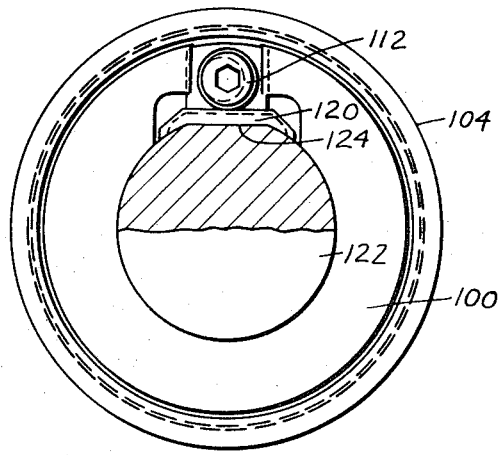
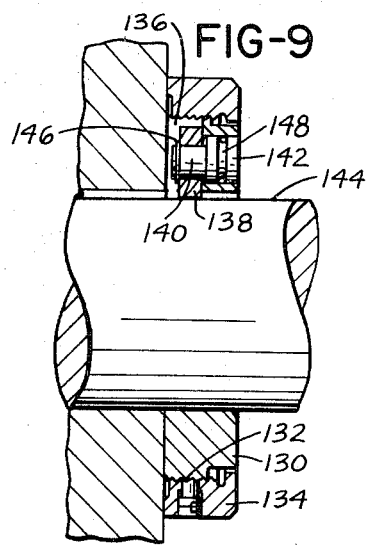
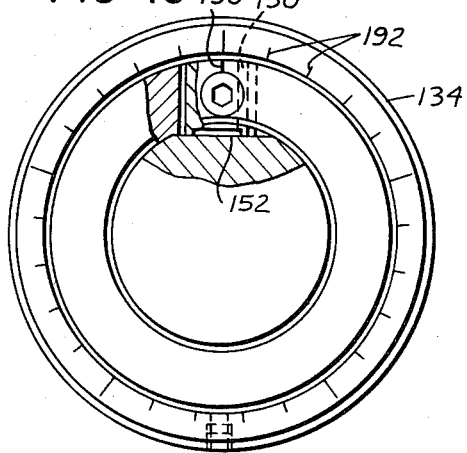
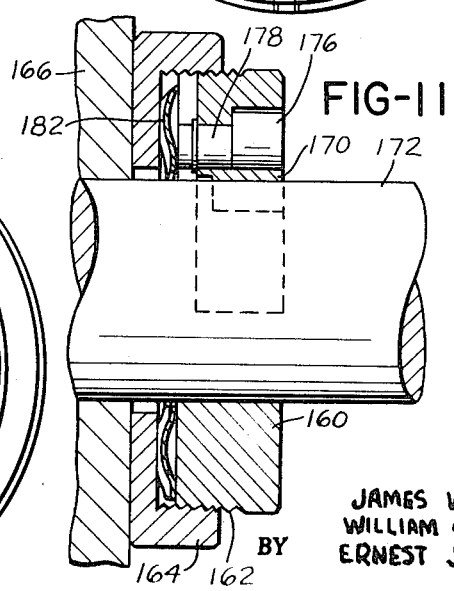
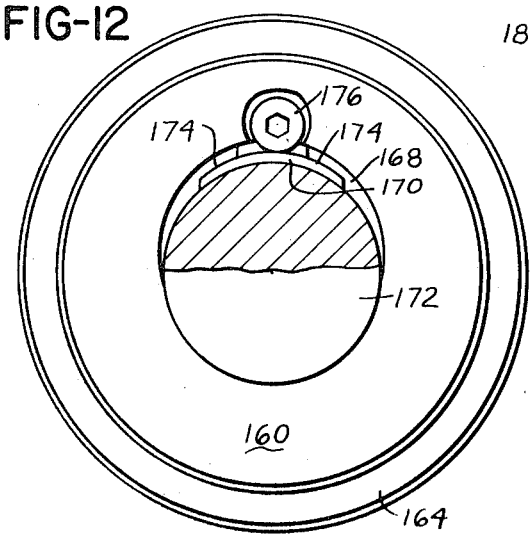
INVENTORS
JAMES W. HEATON
WILLIAM C. EVERSOLE
ERNEST J. FRIEDLINE ic
ADJUSTING COLLAR ARRANGEMENT, ESPECIALLY FOR A BORING BAR The present invention relates to an adjusting collar, especially for a boring bar or the like and, in particular, relates to an adjusting collar which is detachably mounted on the boring bar.

Boring bars are widely used in machining operations and comprise an elongated bar element with a cutting tip on the outer end thereof. The other end of the bar is received in a support block which may, for example, be a turret on a machine or some other suitable solid supporting member having a bore for receiving the boring bar. The boring bar is clamped in the support therefor by clamp screws which engage the bar, or by forming a slot in the support and drawing the support up around the boring bar.

In any case, fine axial adjustment of the boring bar is often necessary and it is preferred for such adjustment to be made with accuracy, particularly where the machining operations being carried out are numerically controlled, or under the control of a template or the like. When the machining operations are being carried out automatically, precise positioning of the cutting tip is necessary to insure that the machined work will be accurately sized.

It is also the case that where the machining operations are being carried out manually, fine adjustment of the position of the boring bar might be necessary and the adjusting collar according to the present invention is also of merit in these circumstances.

Having the foregoing in mind, a primary objective of the present invention is the provision of an arrangement for effecting fine axial adjustment of a member such as a boring bar in a support therefor.

Another object is the provision of a relatively simple device adapted for being clamped to a boring bar and providing a finely adjustable abutment therefor for determining the projection of the boring bar from a support therefor.

A still further object is the provision of an adjusting device of the nature referred to which can be supplied with new manufacture or which can be used with existing boring bars as well.

These and other objects and advantages of the present invention will become more apparent upon reference to the following detailed specification taken in connection with the accompanying drawings in which:

FIG. 1 is a top plan view partly in section showing a boring bar and a support therefor and an adjusting collar according to the present invention mounted on the boring bar;

FIG. 2 is a view partly in section looking at the adjusting collar from the right side of FIG. 1;

FIG. 3 is a sectional view showing one of the rings making up the adjusting collar and forming the adjusting nut thereof;

FIG. 4 is a side view of the other one of the rings making up the adjusting collar and forming the clamping ring thereof;

FIG. 5 is a vertical sectional view through a modification;

FIG. 6 is a vertical sectional view through another modification;

FIG. 7 is a vertical sectional view through still another modification;

FIG. 8 is a fragmentary view looking in at the structure of FIG. 7 from the right side thereof;

FIG. 9 is a vertical sectional view through a still further modification;

FIG. 10 is a fragmentary view partly broken away looking in at the FIG. 9 arrangement from the right side;

FIG. 11 is a vertical sectional view through another modification; and

FIG. 12 is a fragmentary elevational view looking in at the FIG. 11 arrangement from the right side thereof.

BRIEF SUMMARY OF THE INVENTION

According to the present invention, an adjusting collar is provided having a first part adapted for being fixedly clamped to a boring bar. This part can, for example, be in the form of a split collar or the like. The first part of the adjusting collar is provided with a fine thread, for example, a 40 pitch thread and mounted thereon is a rotatable ring-like second part.

Preferably, a detent or friction mechanism is interposed between the first and second parts and provides for retaining of the parts in any predetermined relative adjusted position thereof.

In use, the adjusting collar is clamped to the boring bar in such a position that it will substantially abut the face of a support member in which the boring bar is mounted. Rough axial adjustment of the boring bar can be effected before the adjusting collar is fixedly clamped thereto and after the rough adjustment is accomplished then the collar is clamped in place on the bar, rotation of the aforementioned second part of the adjusting collar can be utilized for effecting fine axial adjustment of the boring bar in its support.

When the boring bar is adjusted to the desired position, it is fixedly clamped in the support and will remain in its adjusted position till further adjustment is necessary, whereupon the boring bar is loosened in its support and the procedure described above is followed.

DETAILED DESCRIPTION

Referring to the drawings somewhat more in detail, in FIG. 1, a tool holder, such as a boring bar, is shown at 10 and this tool has one end supported in a block 12 and held therein as by clamp bolts or the like.

According to the present invention, in order to obtain fine adjustment of tool 10 in the axial direction, an adjusting collar is provided on the boring bar comprising an inner ring 14 which is split and fixedly clamped to the bar as by clamp screw 16 and having a reduced diameter threaded portion 18 on which a ring-like nut 22 is threadedly mounted. Ring-like nut 22 abuttingly engages support block 12 and can provide for fine controlled axial adjustment of bar 10 merely by loosening the clamping arrangement which clamps the bar in block 12.

The thread interconnecting ring-like nut 22 and reduced diameter portion 18 of clamp ring 14 is preferably a 40 pitch thread so that one complete revolution of ring-like nut 22 will provide for 0.025 of an inch axial adjustment of bar 10. It will be apparent that one or both of collar 14 and ring-like nut 22 could bear indicia for indicating the adjusted position of ring-like nut 22 so that the adjustment of the boring bar could be quite accurately determined.

Ring-like nut 22 is adapted for being held in adjusted position as by a nylon plug 26 pressed radially inwardly against the threads on reduced diameter portion 18 of collar 14 by a set screw 24.

As will best be seen in FIGS. 2, 3 and 4, clamp ring 14 is provided with a radial saw slot 20 extending inwardly thereof from dotted line 21 clockwise to dotted line 23 so as to separate reduced diameter portion 18 from the portion of clamp ring 14 through which clamp screw 16 extends and which portion of the clamp ring is separated, or split, as indicated at 28. The provision of slot 20 will permit the portion of the clamp ring which bears clamp screw 16 to flex and thereby to grip the tool or bar without imposing deflectively loads on reduced diameter portion 18 that would interfere with the operation of ring-like nut 22.

FIGS. 2 and 4 will also show that ring-like nut 22 has a notch 30 through which access can be had to the head of clamping screw 16. The periphery of ring-like nut 22 is preferably knurled so that it can be manually adjusted but the nut can also be provided with one or more spanner wrench recesses 32 if so desired.

The arrangement of FIG. 5 comprises a split tapered ring 40 embracing boring bar 42 and adapted for engaging a complementary tapered outer ring 44 which has the external fine thread 46. A clamp nut 48 is threaded on threads 46 and has a radial flange 50 engaging the larger end of split tapered ring 40 so as to force the split tapered ring inwardly into ring 44 which will cause contraction of ring 40 and gripping of bar 42 thereby.

The bar 42 may be of the type having a flat formed on one side at 52 and rotation of ring 44 on the bar during adjustment of clamp nut 48 is prevented by a pin 54 carried by ring 44 and extending down toward the bar to within the range of the portion thereof which is cut off to form the flat 52.

An adjusting nut 56 is provided which is threaded on the threads 46 and which engages support 58 for bar 42 to provide for adjustment thereof in the hereinbefore described manner.

Both ring-like nut 22 of the first modification, and ring-like nut 56 of the modification of FIG. 5, advantageously are provided with a smooth raised axially projecting peripheral portion 60 for engagement with the adjacent support member. Plug 62, nylon, for example, and set screw 64 bearing on the outer end thereof provide for clamping ring-like nut 56 in adjusted positions thereof.

In the modification of FIG. 6, there is provided an inner collar member, or ring, 70 receivable on bar 72, said bar having a flat at 74 cooperating with a pin 76 in inner ring 70 to hold the collar against rotation on the bar. The portion of inner ring 70 adjacent support member 78 for the bar is provided with a fine thread on which is mounted the adjusting nut 80 having mounted therein the nylon plug 82 and set screw 84.

Attached to the portion of ring 70 on the side opposite support 78 and, by a reduced diameter region 86, is a chuck-like portion consisting of segments 88 which are separated from each other by axial slots. Segments 88 at their outer ends are tapered as at 90 and are engaged by the correspondingly tapered flange 92 of a clamp nut 94 engaging the threads on the outer periphery of inner ring 70. Tightening of nut 94 will clamp inner ring 70 fixedly to the bar and rotation of ring-like nut 80 will adjust the bar axially relative to support 78.

In FIG. 7, the adjusting collar comprises the inner ring portion 100, peripherally threaded as at 102 for receiving a ring-like adjusting nut 104.

At one side of ring 100 there is a portion 106 of reduced axial dimension, formed by axial notches in the ring, and having a hole 108 for receiving the shank 110 of a screw having an eccentric head 112 and forming a cam. At the outer end of shank 110 there is a retaining ring 114 that retains in place on the shank the leg 116 of a clamp member which extends axially away from support member 118 to the opposite side of the reduced thickness portion 106 of inner ring 108. On the side of inner ring 100, which faces away from support 118, the clamp member has a radially inner elongated part 120 adapted for engaging the boring bar and which is pressed toward the boring bar by rotation of the cam which will cause the eccentric head 112 thereof to press part 120 against the boring bar.

As will be seen in FIG. 8, the head 112 of the cam engages part 120 of the clamp member in about the middle thereof and will push this portion of the clamp member down toward the boring bar 122 in clamping engagement therewith. The boring bar in this case is provided with a flat 124 and the clamp member is shaped to engage the flat but could also engage a cylindrical boring bar.

In FIG. 9, the adjusting collar will be seen to comprise an inner ring part 130 externally threaded at 132 to receive the ring-like adjusting nut 134. The inner ring 130 on one side is provided with a radial recess 136 in which is loosely disposed a clamp member 138. This clamp member is carried on the eccentric portion 140 of a rotatable cam 142, the head of which is rotatably journaled in inner ring 130. Rotation of cam 142 will move clamp member 138 toward and away from the surface of boring bar 144 into and out of clamping engagement therewith. The clamping member or locking plate 138 is retained on eccentric portion 140 of the cam by a retaining ring 146 while the head 142 of the cam is provided with a groove 148 adapted for receiving a roll pin 150 in ring 130 as will be seen in FIG. 10.

FIG. 10 also shows that the locking plate is so constructed at its lower end that it can rest on flat 152 formed on one side of the boring bar and also so that it can rest, equally well, on the periphery of a cylindrical boring bar.

FIGS. 11 and 12 show a modification in which the adjusting collar comprises an inner ring 160 having external thread 162 on which is threaded a ring-like adjusting nut 164 that bears against support 166.

The inner ring 160 in FIGS. 11 and 12 is characterized in the provision therein of an eccentrically located circular saw cut extending axially into the ring and forming a portion 170 which extends along the boring bar 172 while being free to flex toward and away from the bar. The flexing action of portion 170 may be enhanced by the recesses, or notches, 174 extending inwardly from the lateral limits of portion 170 at the back thereof. Flexing of part 170 is accomplished by the eccentric head 176 of a rotary cam upon rotation thereof, said cam having a shank 178 journaled in inner ring 160 and retained therein by a retaining ring 180. FIG. 11 also shows that friction may be exerted between adjusting nut 164 and inner ring 160 by a wave washer 182 to retain the adjusting nut in its adjusted positions on the inner ring.

It has been mentioned that one or both of the adjusting nut and inner ring can be calibrated and an example of this is shown in FIG. 10. In FIG. 10, the inner ring has an index mark at 190 and adjusting nut 134 is provided with radial index marks 192. With the thread that connects the adjusting nut with the inner ring selected as 40 pitch, 25 index marks 192 are provided on the adjusting nut in uniformly circumferentially spaced relation. Rotation of the ring-like adjusting nut an angular distance equal to the distance between two adjacent ones of the marks 192 thus provides for axial adjustment of the tool or boring bar a distance of 0.001 inches.

Modifications may be made within the scope of the appended claims.

We claim:

1. A device for mounting on a bar-like tool holder and adapted for adjusting the tool holder in the axial direction on a support therefor which has a bore extending into one end for slidably receiving said tool holder and which support includes means for locking said tool holder in axially adjusted position in said bore, said device comprising; a ring slidably receivable on said tool holder, and having a first axial portion which is externally threaded and a second axial portion which is radially split at one circumferential point, said ring being adapted for mounting on said bar with said first axial portion nearest said support, said first and second axial portions of said ring being interconnected only in a region of said second axial portion which is circumferentially spaced from said circumferential point, clamping means on said second axial portion of said ring operable to draw the second axial portion up tight on said holder, an internally threaded adjusting nut threaded on the threads of said ring and adjustable on said ring into abutting engagement with said one end of said support, and retaining means operatively engaging said ring and nut and operable for retaining said nut in rotated positions on said ring.

2. A device according to claim 1 in which said ring and nut include opposed radial annular faces, said retaining means is in the form of at least one wave washer disposed between said opposed faces and in frictional engagement therewith.

3. A device according to claim 1 in which said clamping means comprises a clamp screw joining the opposed ends of said ring at said split and operable for drawing said opposed ends together to draw the ring up tight on said holder.

4. A device according to claim 1 in which said nut has a radial portion on the side facing said support and a peripheral axial portion surrounding said ring.

* * * * *